United States Patent [19]

Wakabayashi

[11] Patent Number: 5,481,322
[45] Date of Patent: Jan. 2, 1996

[54] CAMERA WITH MAGNETIC HEAD FOR RECORDING INFORMATION ON FILM

[75] Inventor: Tsutomu Wakabayashi, Tokyo, Japan

[73] Assignee: Nikon Corporation, Tokyo, Japan

[21] Appl. No.: 209,370

[22] Filed: Mar. 14, 1994

Related U.S. Application Data

[63] Continuation of Ser. No. 117,660, Sep. 19, 1993, abandoned, which is a continuation of Ser. No. 745,288, Aug. 19, 1991, abandoned.

[30] Foreign Application Priority Data

Aug. 17, 1990 [JP] Japan ..................... 2-217543

[51] Int. Cl.[6] ................................. G03B 17/24
[52] U.S. Cl. ................................. 354/105
[58] Field of Search ..................... 354/105, 106, 354/75, 76

[56] References Cited

U.S. PATENT DOCUMENTS

| | | | |
|---|---|---|---|
| 4,642,717 | 2/1987 | Matsuda et al. | 360/105 |
| 4,832,275 | 5/1989 | Robertson | 242/71.1 |
| 4,864,332 | 9/1989 | Harvey | 354/21 |
| 4,996,546 | 2/1991 | Pagano et al. | 354/105 |
| 5,014,078 | 5/1991 | Kudo et al. | 354/195.1 |
| 5,016,030 | 5/1991 | Dwyer et al. | 354/106 X |

FOREIGN PATENT DOCUMENTS

| | | |
|---|---|---|
| 0363849A1 | 4/1990 | European Pat. Off. . |
| 0435277A2 | 3/1991 | European Pat. Off. . |
| 0433019A1 | 6/1991 | European Pat. Off. . |
| 0464721A2 | 1/1992 | European Pat. Off. . |

*Primary Examiner*—Michael L. Gellner
*Assistant Examiner*—J. K. Han
*Attorney, Agent, or Firm*—Shapiro and Shapiro

[57] ABSTRACT

A camera for magnetically recording predetermined information in a magnetic recording area of a film is provided with a magnetic head to be maintained in contact with the magnetic recording area of the film for magnetically recording predetermined information in the magnetic recording area; a power supply holding device for starting power supply by turning on a half-stroke depression switch in response to a half-stroke depression of a shutter release button, holding the power supply at least until the lapse of a predetermined period after the cancellation of the half-stroke depression and terminating the power supply only after the lapse of the predetermined period; and a head contact/retracting device for contacting the magnetic head with the magnetic recording area of the film and retracting the magnetic head from the magnetic recording area; and a controller for controlling the head contact/retracting device in such a manner as to maintain the magnetic head in a contact position in contact with the magnetic recording area during the power supply holding by the power supply holding device, and in a retracted position retracted from the magnetic recording area when the holding of power supply is terminated.

34 Claims, 12 Drawing Sheets

FIG. 7
FIG. 7A
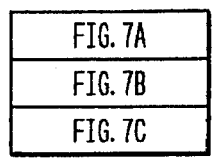
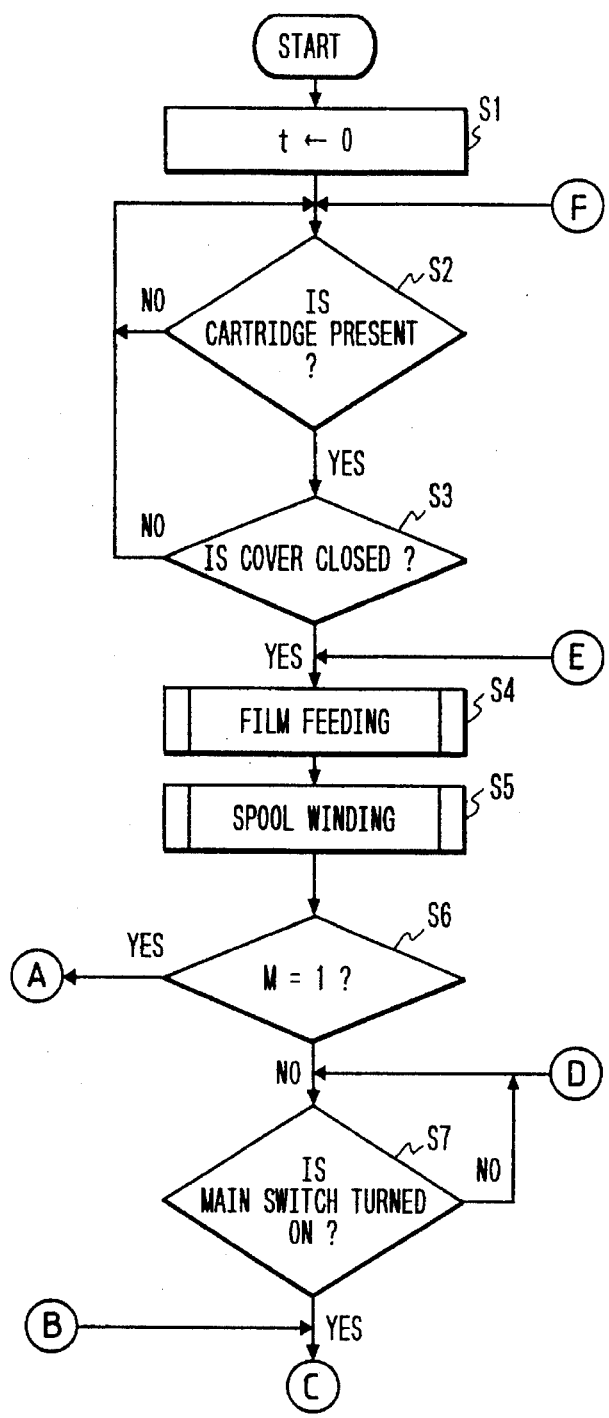

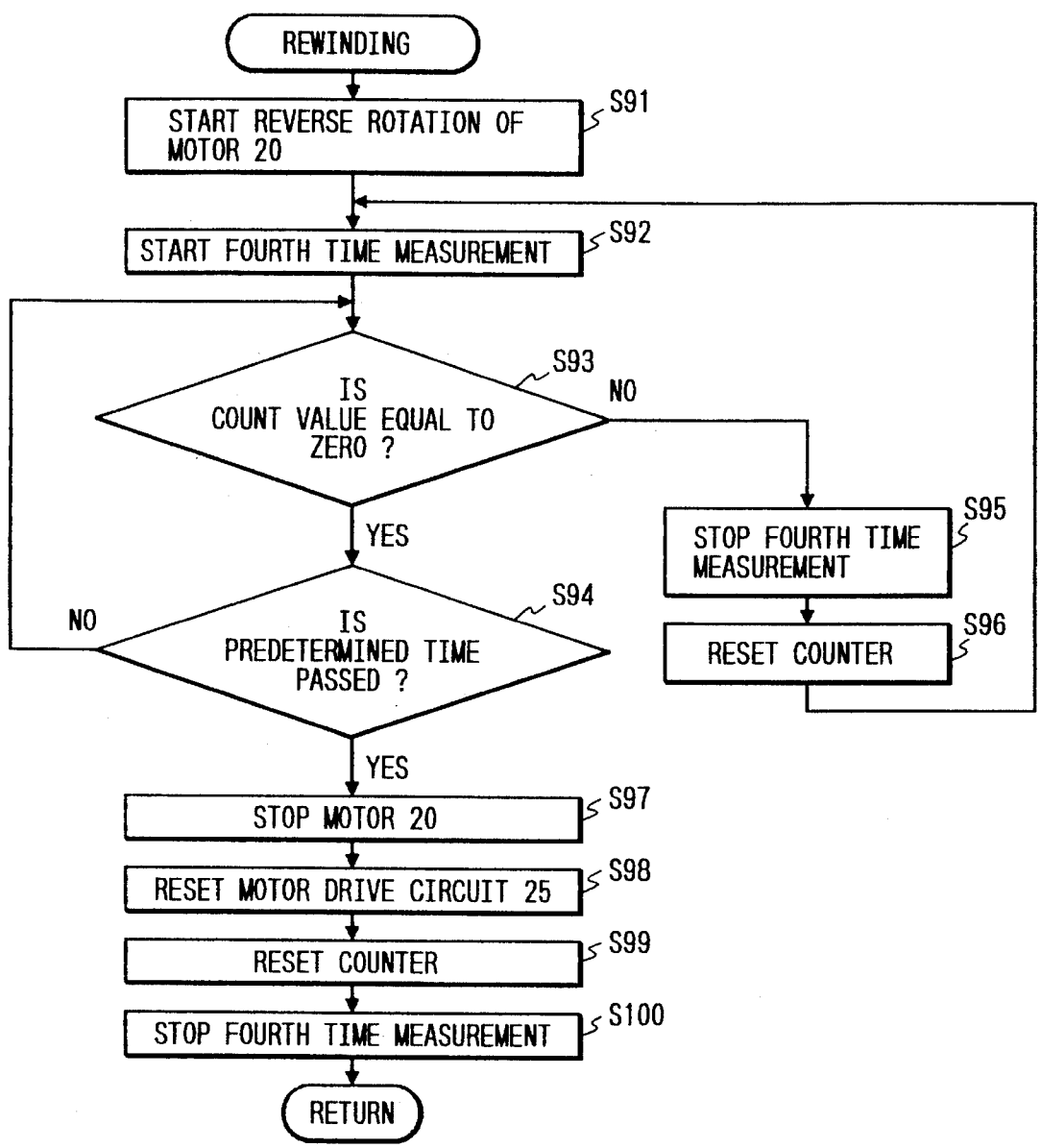

CAMERA WITH MAGNETIC HEAD FOR RECORDING INFORMATION ON FILM

This is a continuation of application Ser. No. 117,660 filed Sep. 8, 1993, which is a continuation of application Ser. No. 745,288 filed Aug. 14, 1991, both now abandoned.

BACKGROUND OF THE INVENTION

1. Field of the Invention

The present invention relates to a camera equipped with a magnetic head for magnetically recording predetermined information in a magnetic recording area of a film.

2. Related Background Art

There is already known a technology, as disclosed in the U.S. Pat. No. 4,864,332, of forming a magnetic material in the form of a magnetic recording area corresponding to each image frame on a photographic film, and magnetically recording predetermined information (for example, information on date and time) in said magnetic recording area when said film is loaded in a camera. Such magnetic recording is achieved by maintaining a magnetic head, provided in the camera, in contact with the magnetic recording area of the film and by moving said magnetic recording area with respect to the magnetic head at the film winding (frame advancement).

However, constant pressure contact of the magnetic head with the magnetic recording area of the film may result in deterioration of the magnetic head or deformation of the film. Such drawbacks can be avoided by maintaining said magnetic head in contact with the magnetic recording area only during the film winding operation and retracting said magnetic head from the magnetic recording area in other periods. Nevertheless, even in such an arrangement, the contact and retraction of the magnetic head are repeated, for example, in continuous phototaking operations, and the deformation of film may also arise in such operation.

SUMMARY OF THE INVENTION

The object of the present invention is to provide a camera equipped with a magnetic head, capable minimizing deterioration of the magnetic head and deformation of the film.

Referring to FIG. 1 the present invention is applicable to a camera equipped with a magnetic head 101 maintained in contact with a magnetic recording area 2b of a film 2 for magnetically recording predetermined information in said area 2b. The above-mentioned drawbacks can be resolved by a power supply holding unit 102 which initiates power supply in response to a half-stroke depression of a shutter release button and maintains the power supply for a predetermined period after said half-stroke depression is released; a head contact/retracting unit 103 for contacting the magnetic head 101 with the magnetic recording area 2b of the film 2 or retracting said magnetic head 101 from said area 2b; and a controller 104 for controlling the head contact/retract unit 103 in such a manner that the magnetic head 101 is maintained in contact with the magnetic recording area 2b while the power supply is maintained by the power supply holding unit 102 but said magnetic head 101 is retracted from the magnetic recording area 2b when the holding of power supply is terminated.

The controller 104 maintains, by controlling the head contact/retracting unit 103, the magnetic head 101 in contact with the magnetic recording area 2b while the power supply is maintained by the power supply holding unit 102 (during the half-stroke depression of the shutter release button and during a predetermined period after the termination of said half-stroke depression state), and retracts the magnetic head 101 from the magnetic recording area 2b when the holding of the power supply is terminated. Thus deterioration of the magnetic head is suppressed, and deformation of the film can be prevented since the contact and retraction of the magnetic head are not repeated in succession in case of continuous phototaking operations.

BRIEF DESCRIPTION OF THE DRAWINGS

FIGS. 2 to 11 show various aspects of an embodiment of the present invention, wherein:

FIGS. 2 and 5 are partial perspective views of a camera equipped with a magnetic head in accordance with the present invention;

FIG. 3 is a view showing the structure of the film;

FIG. 6 is a block diagram of a control system;

FIG. 7 is a flow chart of a main control sequence; and

FIGS. 8 to 11 are flow charts of subroutines.

DESCRIPTION OF THE PREFERRED EMBODIMENTS

Figure 1:
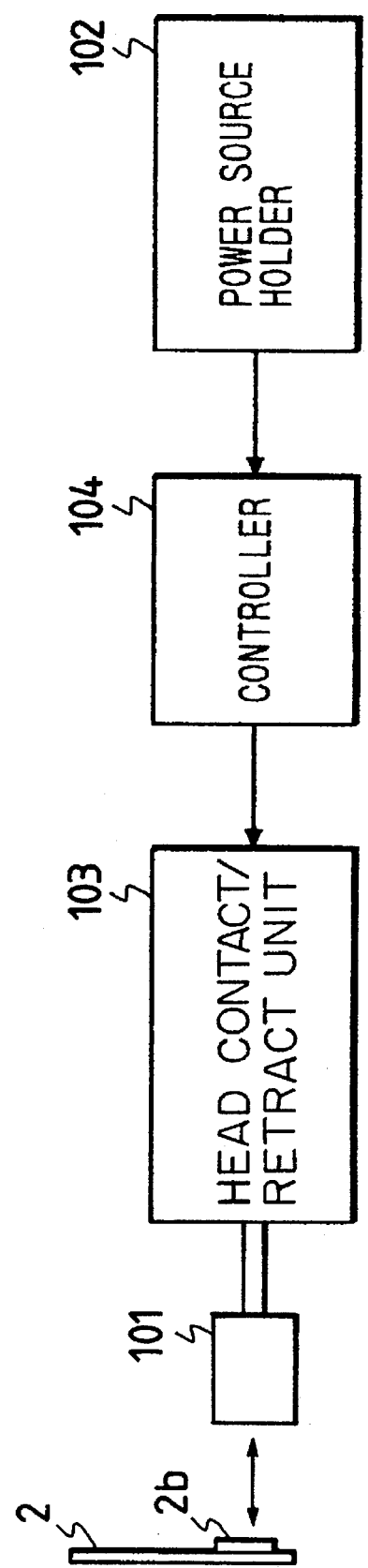
FIG. 1 is a block diagram of a structure according to the present invention.
Figure 2:
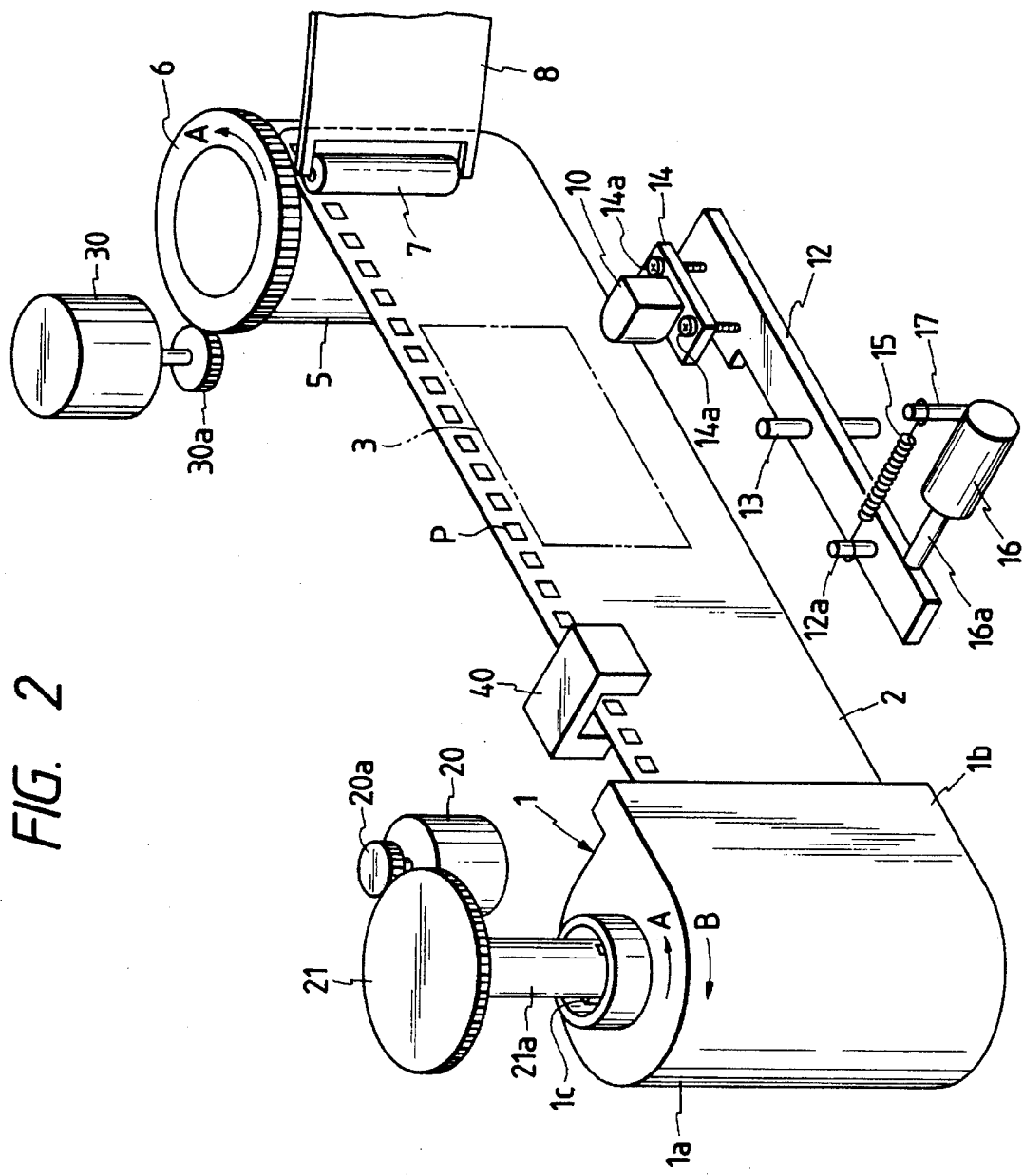

Referring initially to FIG. 2, a film cartridge 1 is composed of a cylindrical portion 1a and a lip portion 1b integrally connected to said cylindrical portion 1a in the tangential direction thereof. A film 2 is housed in said cylindrical portion 1a, being wound on a spool shaft (not shown), and the leading end of said film 2 is positioned, in a linear state, in the lip portion 1b. The film 2 is advanced from a slot at the end of the lip portion 1b by externally rotating said spool shaft in direction A, and is rewound into the cartridge 1 by rotation of said spool shaft in a direction B. Such cartridge 1 is disclosed, for example, in the U.S. Pat. No. 4,832,275.

Said cartridge 1 is loaded in an end portion of a camera body, and the film 2 extracted from said cartridge passes behind an aperture 3 along a film path (not designated), and the leading end of said film is attached on a film winding spool 5 provided at the other end portion of the camera body.

Figure 3:
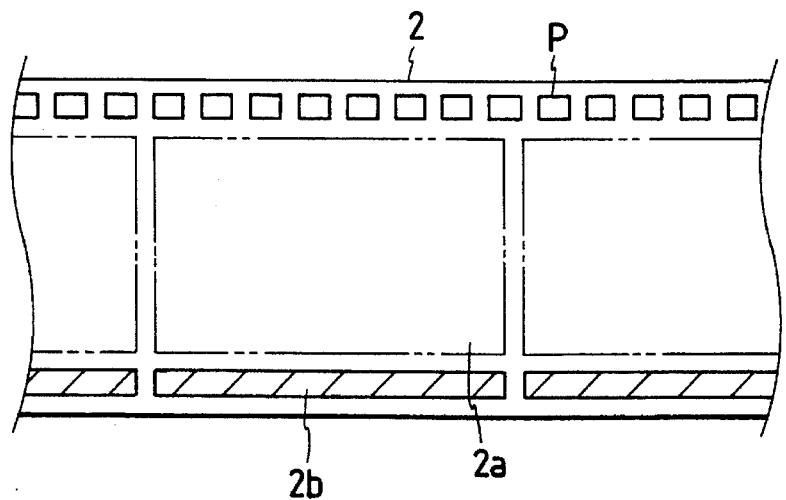

The film 2 of the present embodiment, as shown in FIG. 3, is provided with a series of image recording areas 2a for recording optical (image) information by phototaking operations and magnetic recording areas 2b positioned below and respectively corresponding to said image recording areas 2a. Said magnetic recording areas 2b can magnetically record predetermined information, such as information on the date and time of phototaking, at the film winding operation.

The film 2 is further provided with perforations P as in a conventional film. Said perforations P are utilized, in the present embodiment, for detecting the amount of film advancement by a photosensor 40 to be explained later, but they may also be utilized for advancing the film.

Again referring to FIG. 2, a film pressing roller 7, capable of rotating along the external periphery of said film winding spool 5, is supported by a support plate 8 and biased to the periphery of the winding spool 5 by a spring (not shown). A magnetic head 10, for information recording in the magnetic recording area 2b of the film 2, is provided in a position capable of being contacted with said magnetic recording area 2b.

The magnetic head 10 is mounted on a support lever 12 by means of a bracket 14 and screws 14a, and the inclination of the magnetic head 10 can be adjusted by said screws 14a. The support lever 12 is rendered rotatable about a shaft 13 fixed in the camera body, and a spring 15 is supported by a pin 12a fixed on the other end of said lever 12 and a pin 17 fixed in the camera body. Said spring 15 biases the support lever 12 anticlockwise, namely in a direction to bring the magnetic head 10 into contact with the film 2.

Figure 4A:
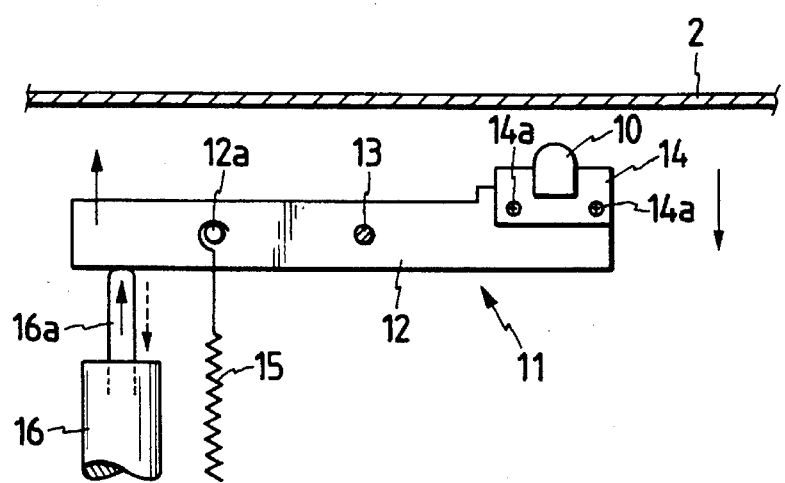
FIGS. 4A and 4B are partial plan views thereof.
Figure 4B:
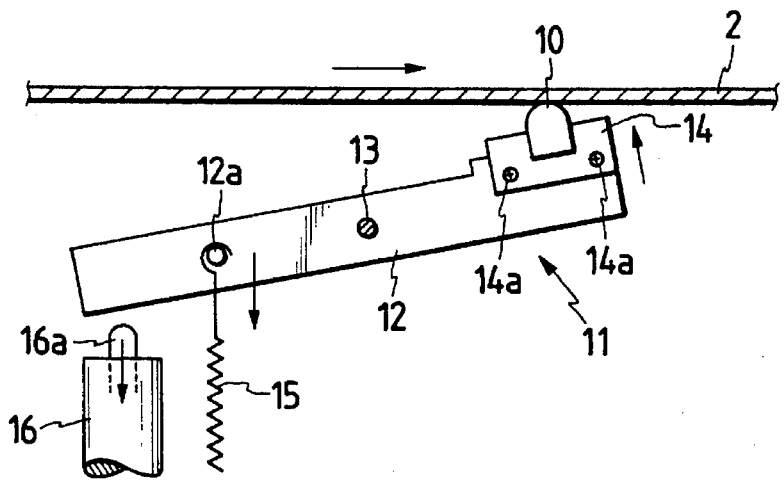
Figure 5:
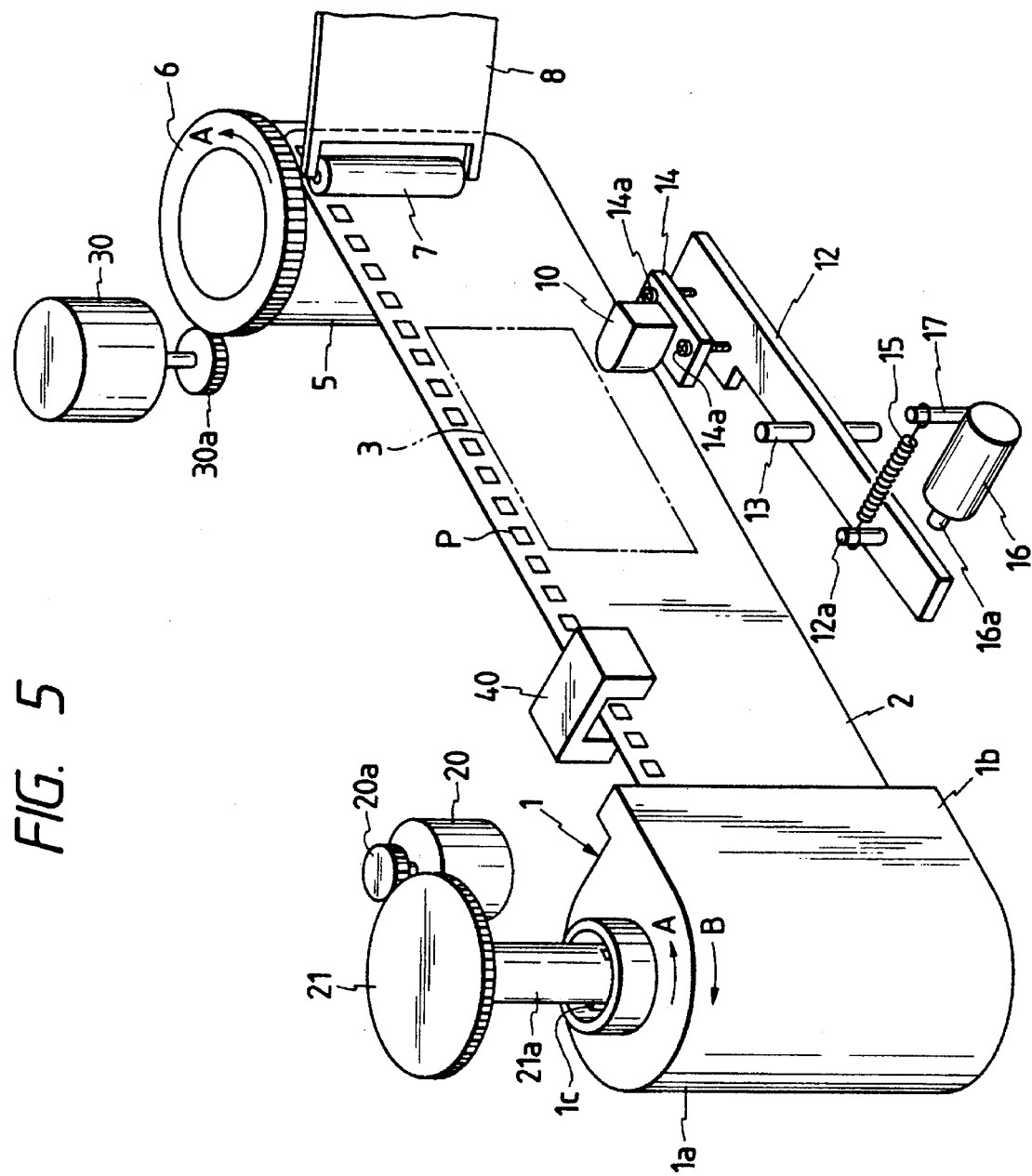

A plunger 16, consisting of a magnetic solenoid and having an engaging rod 16a, maintains said engaging rod in a position shown in FIGS. 2 and 4A by the biasing force of an internal spring (not shown) when said plunger is not energized, whereby the support lever 12 is maintained in the illustrated position against the biasing force of the spring 15 and the magnetic head 10 is retracted from the magnetic recording area 2b of the film 2. When the plunger 16 is energized in this state, an internal core is attracted to retract the engaging rod 16a as shown in FIG. 4B and 5, whereby the lever 12 rotates anticlockwise by the biasing force of the spring 15 and the magnetic head 10 is brought into contact with the magnetic recording area 2b of the film 2, thus becoming capable of magnetic recording.

In a position opposed to the magnetic head 10 and across the film 2, there is provided a felt-like pressure pad (not shown). Thus, when the magnetic head 10 is brought into contact with the film 2, it is pinched between the magnetic head 10 and the pressure pad under a predetermined pressure, whereby the recording or reproduction of information can be conducted in appropriate manner.

A film advancing and rewinding motor 20 is provided, on the output shaft thereof, with a gear 20a engaging with a film driving gear 21. Said gear 21 has an integrally rotatable key which engages with a spline 1c at the upper end of the spool shaft of the cartridge 1. A motor 30 for film end attaching and frame advancing, is provided, on the output shaft thereof, with a gear 30a engaging with a gear 6 formed in the upper part of the winding spool 5. A photosensor 40, provided with a light-emitting element and a light-receiving element (both not shown) positioned across the perforated portion of the film 2, optically detects the perforations P passing as the result of film advancement and outputs the result of detection after photoelectric conversion, wave-form shaping and amplification.

Figure 6:
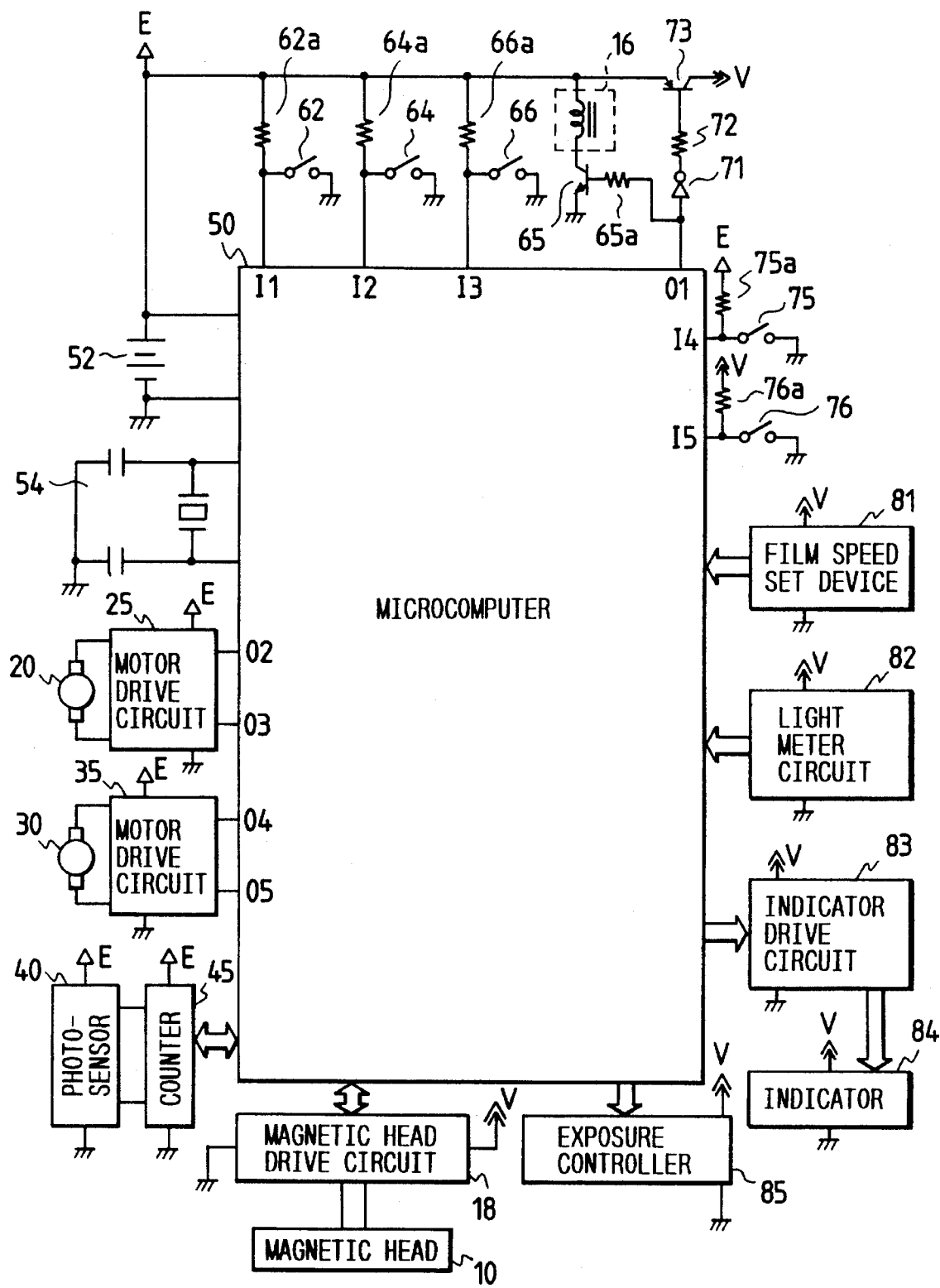

FIG. 6 is a block diagram of a control system of the above-explained camera.

A microcomputer 50, powered by a battery 52, receives clock pulses necessary for computation or time measurement from a reference oscillator 54 and an internal oscillator circuit (not shown). To said microcomputer 50, there are connected a cartridge detection switch 62, a cartridge cover detection switch 64, a main switch 66, a half-stroke depression switch 75 and a shutter release switch 76. The cartridge detection switch 62 is turned on or off respectively when the cartridge 1 is loaded in the camera or taken out therefrom. The cartridge cover detection switch 64 is turned on or off respectively when a cartridge cover of the camera body (a cover of a cartridge chamber) is closed or opened. The main switch 66 is manually operated, and the phototaking operation is inhibited when said switch is off.

The half-stroke depression switch 75 and the shutter release switch 76 are turned on in relation to the depression of a shutter release button (not shown), the former being turned on by the depression of a first stroke and the latter being turned on by the depression of a second stroke. The closing of the half-stroke depression switch 75 initiates power supply to various circuits, and the closing of the shutter release switch 76 identifies the shutter releasing operation and effects the phototaking operation. When the shutter release switch 76 is turned on, the half-stroke depression switch 75 is always on.

Terminals of said switches 62, 64, 66, 75, 76 are respectively connected to input ports I1, I2, I3, I4, I5 of the microcomputer 50 and are connected to the power source through pull-up resistors 62a, 64a, 66a, 75a, 76a, while the other terminals of said switches are grounded.

Motor drive circuits 25, 35 for the abovementioned motors 20, 30 are connected to output ports O2, O3 and O4, O5 of the microcomputer 50. The motor 20 is driven in the forward direction (film advancing direction) when only the output port O2 assumes the high level state, but in the reverse direction (film rewinding direction) when only the output port O3 assumes the high level state, and it is stopped by braking when both output ports assume the high level state. Likewise the motor 30 is driven in the forward direction (film winding direction) when the output port O4 alone is in the high level state, or in the reverse direction when the output port O5 alone is in the high level state, and it is stopped by braking when both output ports are in the high level state.

A magnetic head drive circuit 18 drives said magnetic head 10 to record information in the magnetic recording area 2b of the film 2. An exposure controller 85 is composed of a shutter, a diaphragm and a diaphragm controller, and effects a phototaking operation with a diaphragm aperture and a shutter speed according to an instruction from the microcomputer 50. A counter 45 counts the output of the above-mentioned photosensor 40, sends the obtained count to the microcomputer 50, and is reset to zero by an instruction therefrom.

An output port O1 of the microcomputer 50 is connected, through an inverter 71 and a resistor 72, to the base of a PNP transistor 73, of which the emitter and collector are respectively connected to the battery 52 and a power supply line V. Said output port O1 is also connected, through a resistor 65a, to the base of an NPN transistor 65, of which the emitter and collector are respectively grounded and connected to a terminal of the plunger 16. Plunger 16 has its other terminal connected to the battery 52. When the output port O1 is shifted to the high level state, a low-level signal obtained from the inverter 71 turns on the transistor 73, whereby various switches and circuits are powered through the power supply line V. At the same time, the high level signal from the port O1 turns on the transistor 65, thereby energizing the plunger 16.

In the following description, the shift of the output port O1 to the high level state shall be referred to as the output of a power signal, and the shift of said port O1 to the low level state shall be referred to as the termination of the power signal.

A film speed setting device 81 enters the film speed information in the form of a digital signal into the microcomputer 50, for example by reading said information printed in a predetermined position of the cartridge 1. A light metering circuit 82 receives the light from an object by means of a photosensor (not shown), then effects amplification and analog-to-digital conversion, and enters the obtained object luminosity into the microcomputer 50. An indicator drive circuit 83 drives an indicator unit 84, composed, for example, of light-emitting diodes or a liquid crystal display unit, in response to indication signals from the microcomputer 50, thereby displaying shutter speed, diaphragm aperture etc.

Among the circuits and switches shown in FIG. 6, the cartridge detection switch 62, cartridge cover detection switch 64, main switch 66, plunger 16, motor drive circuits 25, 35, photosensor 40, counter 45, transistor 73 and half-stroke depression switch 75 are powered by the battery 52. On the other hand, the shutter release switch 76, film speed setting unit 81, light metering switch 83, indicator drive circuit 83, indicator 84, exposure controller 85 and magnetic head drive circuit 18 are powered by the power supply line V. Those powered by said line V are principally used for preparation for the ordinary phototaking operation, with relatively high power consumption, and are deactivated when the transistor 73 is turned off.

In the following there will be explained the control sequence of the microcomputer 50 with reference to a flow chart of main program shown in FIG. 7 and flow charts of subroutine programs shown in FIGS. 8 to 11.

Figure 7B:
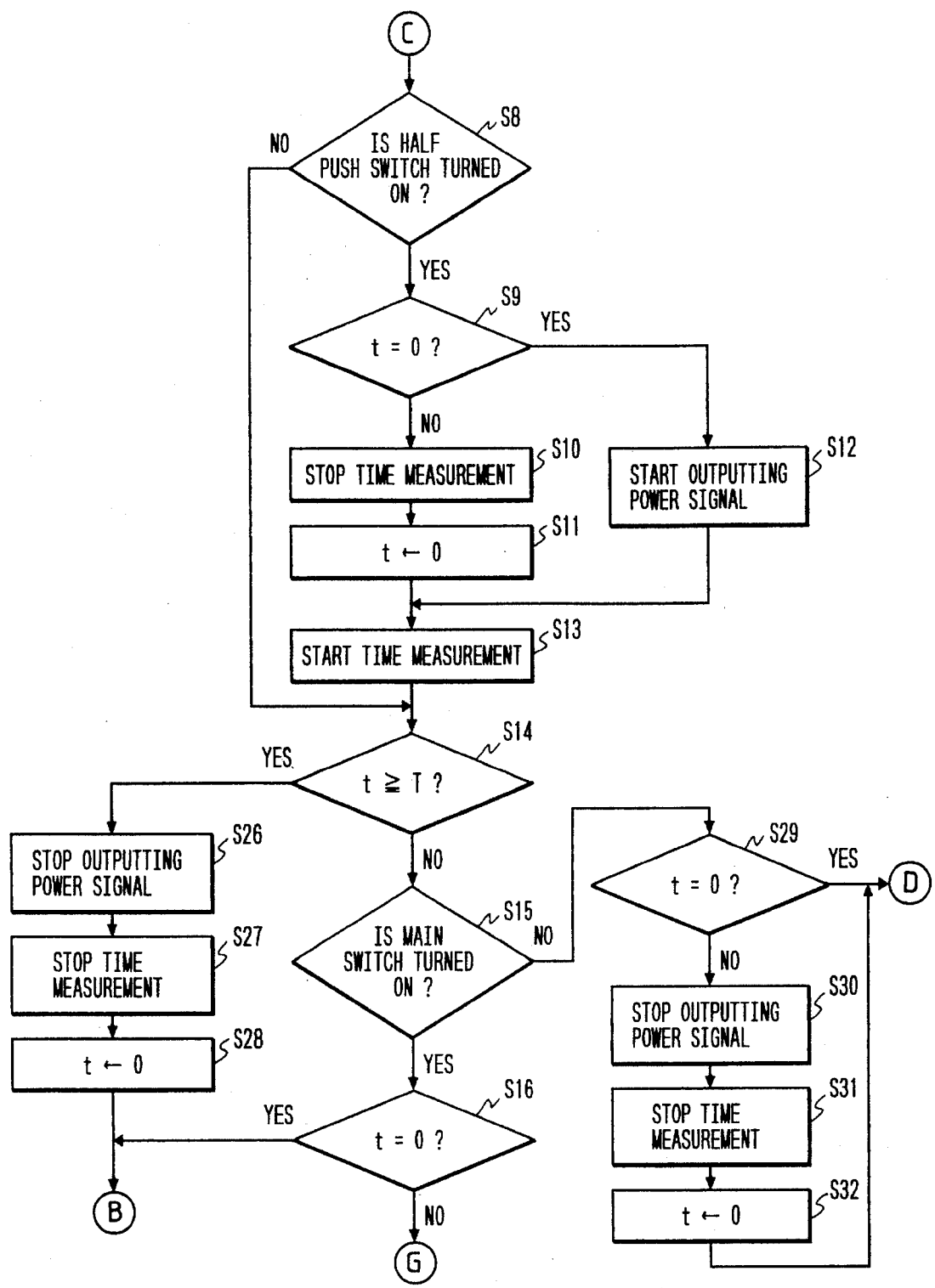
Figure 7C:
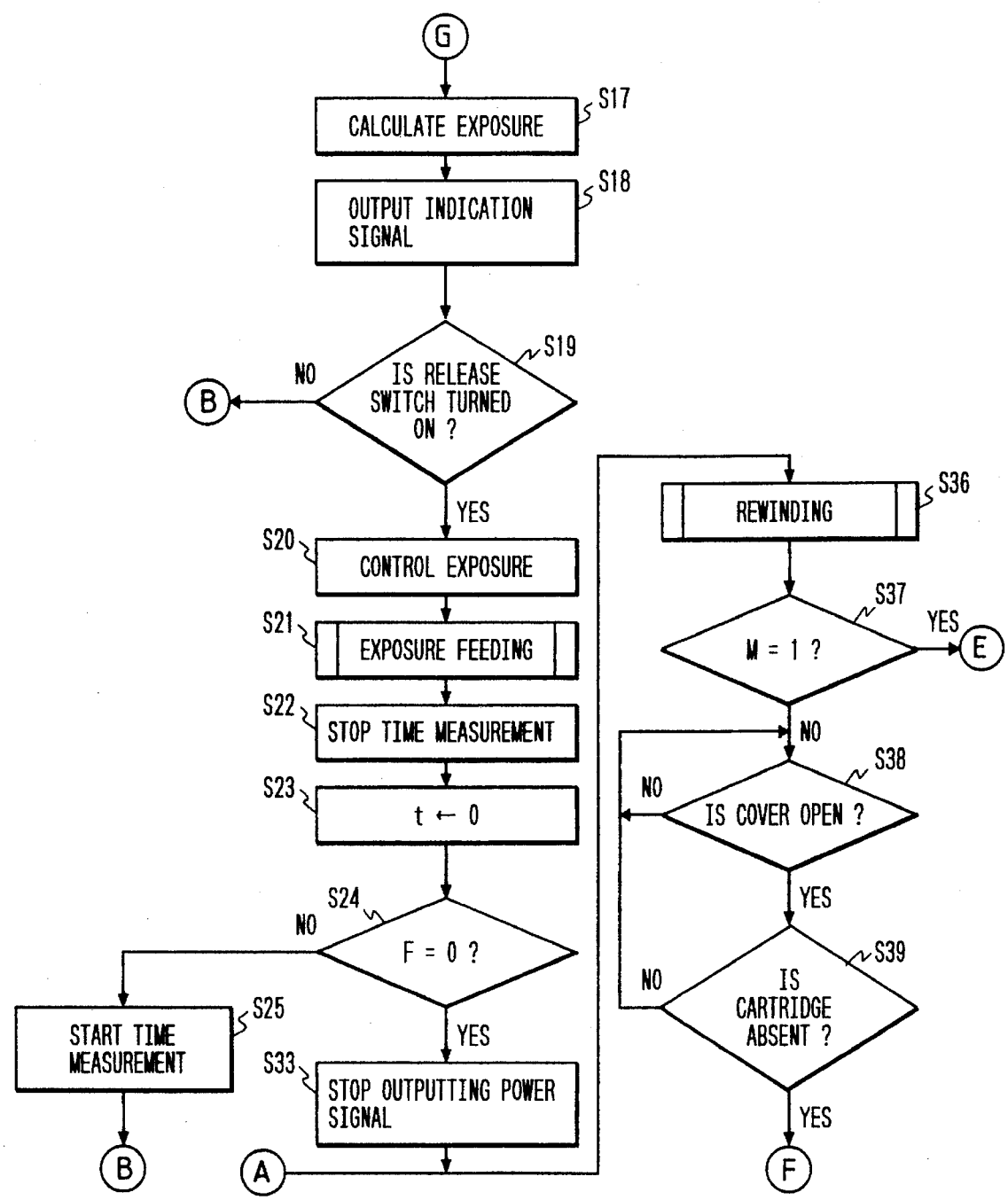

The main program shown in FIG. 7 is activated when the battery 52 is loaded in the camera body. In this state the plunger 16 is not energized so that the engaging rod 16a is in the protruding state, whereby the magnetic head 10 is retracted from the magnetic recording area 2b of the film 2.

Figure 8:
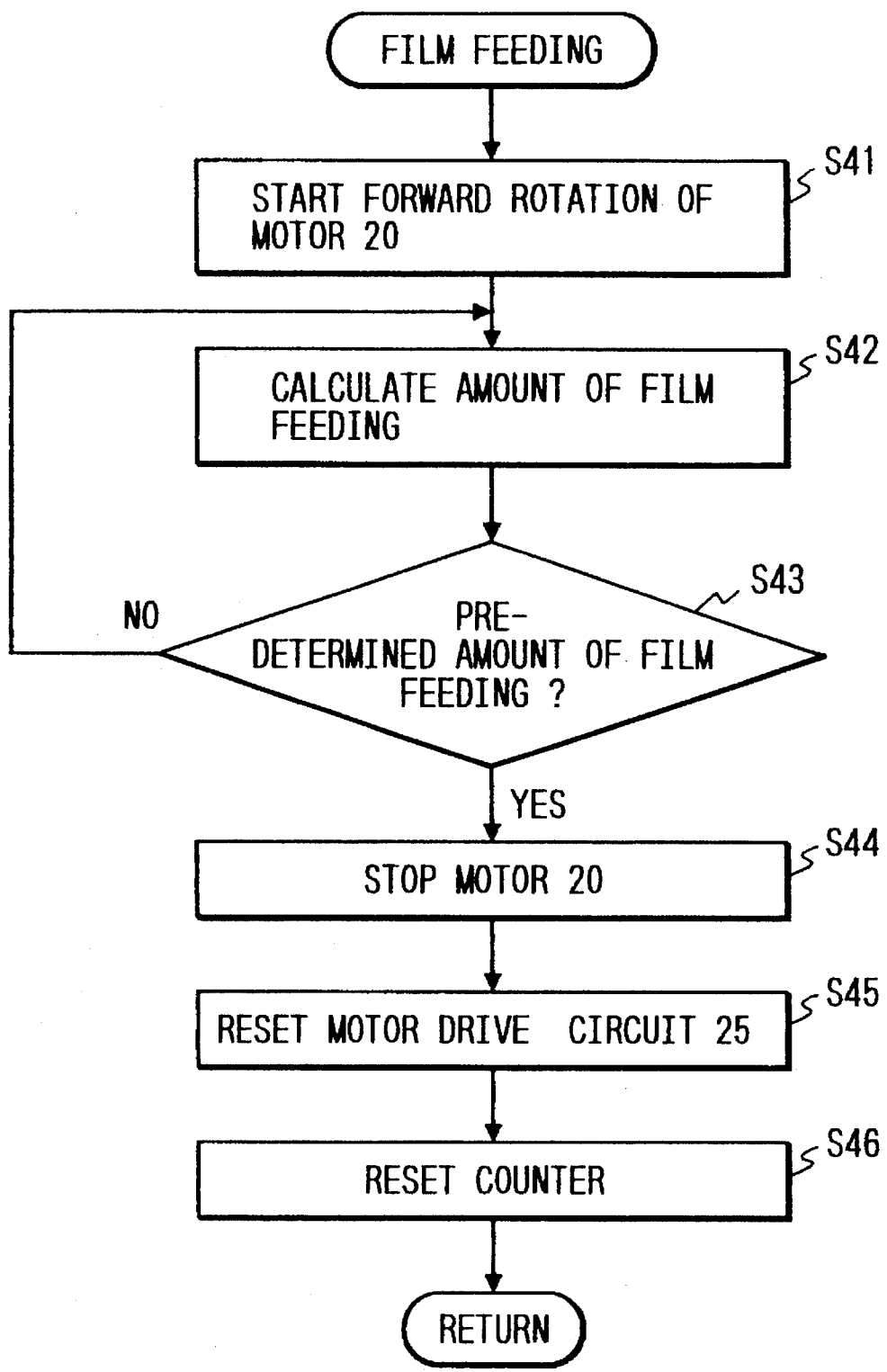

At first a step S1 resets the measured time t to zero. Then a step S2 discriminates, from the state of the cartridge detection switch 62, whether the cartridge 1 is loaded in the camera body. The sequence remains in the step S2 if the switch 62 is off, indicating the absence of the cartridge, or proceeds to a step S3 if said switch 62 is on. The step S3 discriminates, based on the state of the cartridge cover detection switch 64, whether the cartridge cover is closed. The sequence returns to the step S2 if the switch 64 is off, indicating that the cartridge cover is not closed, or proceeds to a step S4 if said switch is on. The step S4 advances the film 2 from the cartridge 1. The details of said step S4 are shown in FIG. 8.

At first a step S41 shifts the output port O2 alone to the high level state, thereby rotating the motor 20 in the forward direction through the motor drive circuit 25. Thus the spline 1c of the cartridge 1 is rotated in the direction A through the gears 20a, 21 to advance the film 2 from the cartridge 1. Then a step S42 converts the count of the counter 45 (corresponding to the number of perforations P detected by the photosensor 40) into the amount of film advancement.

A step S43 discriminates whether the entered amount of film advancement is enough for the leading end of the film 2 to reach the winding spool 5, and, if not, the sequence returns to the step S42. If the amount of advancement is identified as enough, the sequence proceeds to a step S44. The step S44 shifts the output ports O2, O3 to the high level state thereby braking the motor 20, and the sequence proceeds to a step S45 after a waiting time for secure stoppage of the motor. The step S45 shifts the output ports O2, O3 to the low level state thereby resetting the motor drive circuit 25. Then a step S46 resets the counter 45 to zero, and the sequence returns to the main program shown in FIG. 7.

A step S5 in FIG. 7 effects the attaching of the film 2 onto the winding spool 5. The details of this step are shown in FIG. 9.

Figure 9:
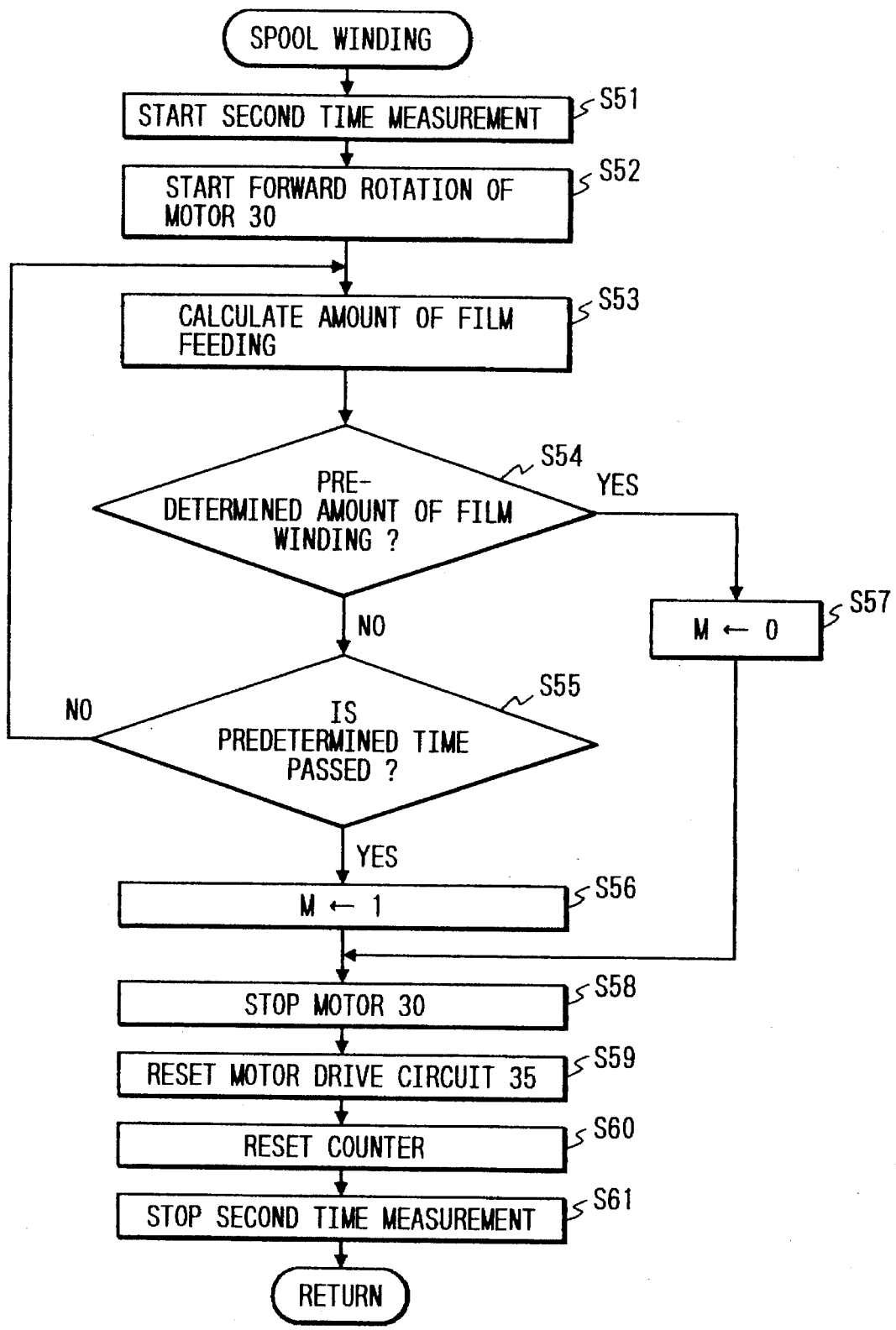

Referring to FIG. 9, a step S51 initiates a second time measurement, separate from the time measurement conducted in the main program shown in FIG. 7. Said second time measurement is utilized in discriminating whether the film 2 is attached onto the winding spool 5 within a predetermined time. A step S52 shifts the output port O4 alone to the high level state, thereby driving the motor 30 in the forward direction through the motor drive circuit 35. Thus the winding spool 5 rotates in the direction A through the gears 30a, 6, whereby the film 2 is wound on the winding spool 5. A step S53 receives the count C of the counter 45 and converts said count into the amount of film advancement, and a step S54 discriminates whether said amount of film advancement has reached a predetermined amount, which is enough to identify that the film 2 has been wound on the winding spool 5. If the discrimination in the step S54 turned out affirmative, a step S57 resets a variable M to zero and the sequence proceeds to a step S58, but, if said discrimination turns out negative, the sequence proceeds to a step S55.

The step S55 discriminates whether a predetermined time has elapsed from the start of the second time measurement in the step S51, and, if not, the sequence returns to the step S53. If said predetermined time has elapsed, there is identified a failure of winding of the film 2 onto the winding spool 5. Thus a step S56 sets the variable M at "1". Then a step S58 shifts the output ports O4, O5 to the high level state thereby braking the motor 30 through the motor drive circuit 35, and, after a waiting time for secure stoppage of the motor, the sequence proceeds to a step S59.

The step S59 shifts the output ports O4, O5 to the low level state to reset the motor drive circuit 35. Then a step S60 resets the count C of the counter 45 to zero, a step S61 terminates said second time measurement, and the sequence returns to the main program shown in FIG. 7.

Again referring to FIG. 7, a step S6 discriminates the state of the flag M, and the sequence proceeds to a step S36 if M=1 (indicating failure of film winding on the winding spool 5), or to a step S7 if M=0 (indicating success of film winding on the winding spool 5). The step S7 discriminates whether the main switch 66 is on or off, from the state of the input port I3, and the sequence remains in the step S7 if the input port I3 is in the high level state indicating that the switch 66 is off, or proceeds to a step S8 if said port is in the low level state indicating that the switch 66 is on.

The step S8 discriminates whether the half-stroke depression switch 75 is on or off from the state of the input port I4, and the sequence proceeds to a step S14 if the input port I4 is in the high level state indicating that said switch 75 is off, or to a step S9 if said port is in the low level state indicating that said switch 75 is on. The step S9 discriminates whether the measured time (started in the step S13 and different from the second time measurement mentioned above) is zero. If it is not zero, a step S10 terminates the time measurement, then a step S11 resets the measured time to zero, and the sequence proceeds to a step S13 to start the time measurement anew.

On the other hand, if the step S9 identifies the measured time t=0, a step S12 shifts the output port O1 to the high level state thereby starting the output of the above-mentioned power signal. In response, a low-level signal obtained from the inverter 71 is supplied to the base of the transistor 73, thereby activating said transistor 73, whereby the power supply line V is powered through the collector thereof. Also in response to the output of said power signal, the transistor 65 is turned on to energize the plunger 16, whereby the magnetic head 10 is brought into contact with the magnetic recording area 2b of the film 2 as shown in FIGS. 4B or 5. Then the step S13 starts the time measurement and the sequence proceeds to a step S14.

The step S14 discriminates whether t≧T, namely whether the time from the start of measurement has reached a predetermined time T (for example 8 seconds), and, if not, a step S15 discriminates whether the main switch 66 is on or off. If it is on, a step S16 discriminates whether the measured time t is zero, and the sequence returns to the step S8 if t=0, or proceeds to a step S17 if t≠0. The step S17 effects exposure calculation. More specifically, an exposure value Ev is calculated by:

$$Ev=Sv+Bv$$

based on the film speed Sv obtained from the film speed setting device 81 and the object luminocity Bv entered from the light metering circuit 82, and the diaphragm aperture Av and the shutter speed Tv are determined by:

$$Av+Tv=Ev.$$

Then a step S18 outputs an indication signal, thereby displaying thus calculated diaphragm aperture Av and shutter speed Tv on the indicator 84 through the indicator drive circuit 83. Then a step S19 discriminates whether the shutter release switch 76 is on or off, based on the state of the input port I5, and the sequence returns to the step S8 if it is off, or proceeds to a step S20 if it is on.

On the other hand, if the discrimination of the step S14 turns out affirmative, a step S26 shifts the output port O1 to the low level state thereby terminating the output of the power signal. Then a step S27 terminates the time measurement started in the step S13 or S25, a step S28 resets the measured time t to zero, and the sequence returns to the step S8. In response to said termination of the power signal, a high-level signal obtained from the inverter 71 is supplied to the base of the transistor 73, thereby turning off said transistor 73 and terminating the power supply to the line V. Also the transistor 65 is turned off by the shift of the base thereof to the low level state, whereby the plunger 16 is deactivated and the magnetic head 10 is retracted from the magnetic recording area 2b of the film 2 as shown in FIG. 2 or 4A.

If the discrimination of the step S15 turns out negative, a step S29 discriminates whether the measured time is zero, and, if zero, the sequence returns to the step S7. If it is not zero, steps S30–S32 execute a process similar to that in the steps S26–S28, and then the sequence returns to the step S8.

The step S20 executes a phototaking operation by controlling the diaphragm and the shutter through the exposure controller 85 in such a manner that the diaphragm aperture and the shutter speed calculated in the step S17 are realized. Subsequently a step S21 advances the film 2 by a frame. The details of said step are shown in FIG. 10.

Figure 10:
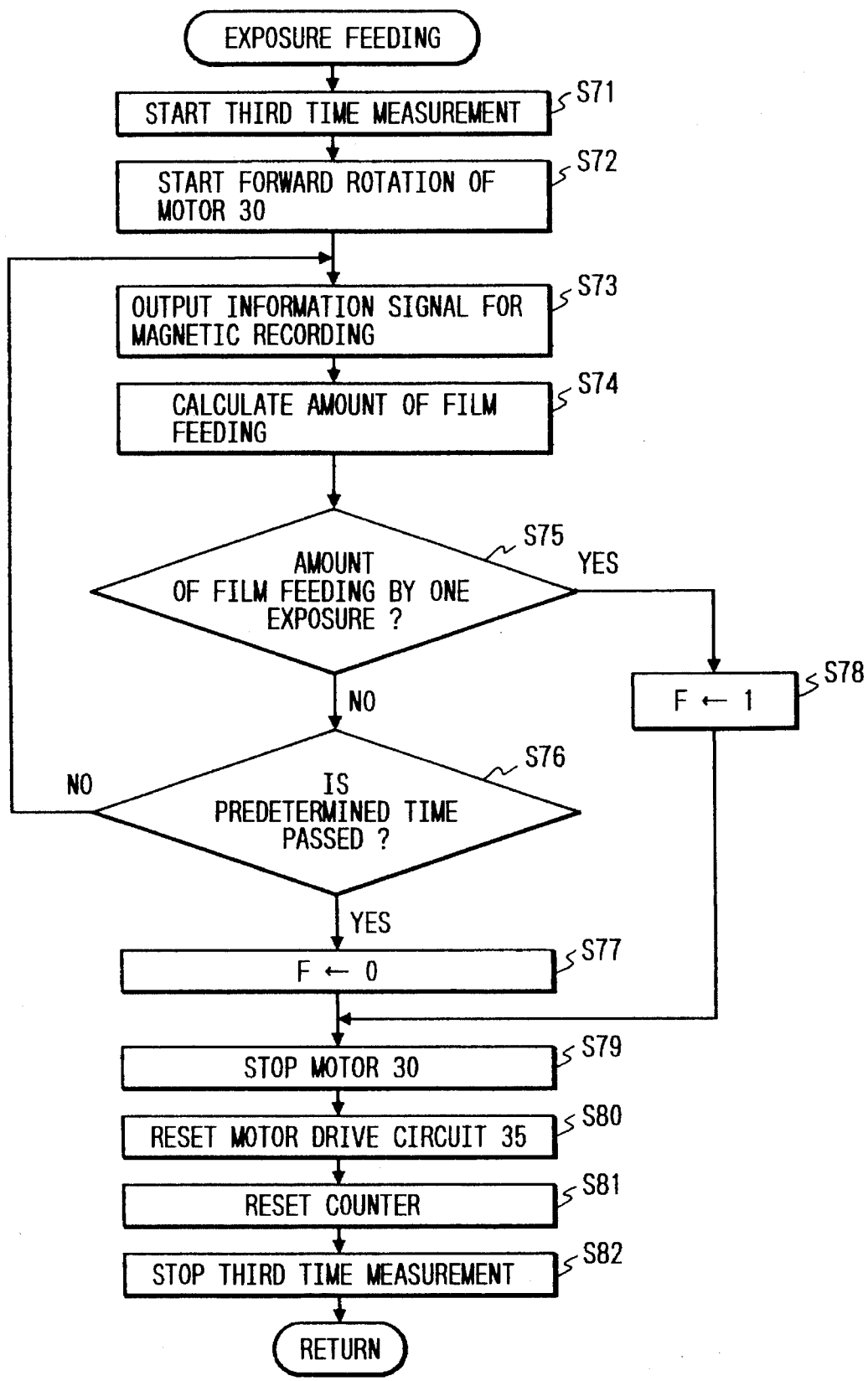

Referring to FIG. 10, a step S71 initiates a third time measurement, which is to be utilized for discriminating whether the film 2 is advanced by a frame within a predetermined time. Then a step S72 shifts the output port O4 to the high level state, thereby driving the motor 30 in the forward direction through the motor drive circuit 35. In response the winding spool 5 is rotated in the direction A to wind the film 2 up. A step S73 sends a recording signal to the magnetic head drive circuit 18, thereby causing the magnetic head 10 to magnetically record predetermined information in the magnetic recording area 2b. As the magnetic head 10 is maintained in contact with the magnetic recording area 2b in this state, the magnetic recording is rendered possible by the movement of the film 2. The information to be recorded is, for example, date and time of phototaking, as explained before.

Then a step S74 calculates the amount of advancement of the film 2, from the count C of the counter 45. A next step S75 discriminates whether the amount of film advancement has reached an amount corresponding to an image frame. If said amount is not reached, the sequence proceeds to a step S76, but, if said amount is reached, a step S78 sets a winding completion flag to "1" and the sequence proceeds to a step S79. The step S76 discriminates whether a predetermined time has elapsed from the start of time measurement in the step S71, and, if not, the sequence returns to the step S73. If said time has elapsed, a step S77 resets a flag F to zero and the sequence proceeds to the step S79. The affirmative discrimination of the step S76 indicates that the film advancement of a frame is not completed even after the lapse of a predetermined time, namely that the film 2 has been wound to the trailing end.

The step S79 sets the output ports O4, O5 at the high level state, thereby stopping the motor 30 through the motor drive circuit 35, and, after a waiting time for secure stoppage of the motor 30, a step S80 sets the output ports O4, O5 at the low level state thereby resetting the motor drive circuit 35. A next step S81 resets the count C of the counter 45 to zero, then a step S82 terminates the third time measurement, and the sequence returns to the main program shown in FIG. 7.

Again referring to FIG. 7, a step S22 terminates the time measurement started in the step S13 or S25. Then a step S23 resets the measured time t to zero, and a step S24 discriminates whether the aforementioned winding completion flag F is zero. If said flag is "1", indicating that the film 2 has not been wound to the trailing end, a step S25 initiates the time measurement and the sequence returns to the step S8. If said flag F is zero, indicating that the film 2 has been wound to the end, a step S33 terminates the output of the aforementioned power signal, and a step S36 effects the rewinding of the film 2, according to the routine shown in FIG. 11.

Referring to FIG. 11, a step S91 sets the output port O3 alone at the low level state thereby reversing the motor 20 through the motor drive circuit 25, and a step S92 initiates a fourth time measurement. The spool shaft of the cartridge 1 is rotated in a direction B by the reverse rotation of the motor 20, whereby the film 2 is rewound into the cartridge 1. A step S93 receives the count C of the counter 45 and discriminates whether said count C is zero. If it is not zero, a step S95 terminates the fourth time measurement, then a step S96 resets the count C of the counter 45 to zero, and the sequence returns to the step S92. A non-zero count C indicates that the movement of the perforations P is being detected by the photosensor 40, namely that the film 2 is still in the rewinding motion.

If the discrimination of the step S93 turns out affirmative, a step S94 discriminates whether a predetermined time has elapsed since the start of time measurement in the step S92. If the sequence returns to the step S93, or, if affirmative, indicating the completion of film rewinding, the sequence proceeds to a step S97. Said step S97 sets the output ports O4, O5 at the high level state thereby stopping the motor 20 through the motor drive circuit 25, and, after a waiting time for secure stoppage of the motor 20, the sequence proceeds to a step S98.

The step S98 sets the output ports O2, O3 at the low level state thereby resetting the motor drive circuit 25. Then a step S99 resets the count C of the counter 45 to zero, a step S100 terminates the fourth time measurement, and the sequence returns to the main program shown in FIG. 7.

Again referring to FIG. 7, a step S37 discriminates whether the aforementioned variable M is zero. A value M=1 indicates that the film rewinding operation is conducted because the failure of film attachment onto the winding spool, and the sequence in this case returns to the step S4 in order to repeat the film advancement. On the other hand, a value M=1 indicates that the film rewinding operation is conducted because the film 2 has been advanced to the trailing end, and the sequence in this case proceeds to a step S38 for discriminating whether the cartridge cover has been opened, based on the state of the cartridge cover detection switch 64. If not, the sequence waits until an affirmative discrimination is obtained, and, when the affirmative discrimination is obtained, a step S39 discriminates whether the cartridge 1 has been removed, based on the state of the cartridge detection switch 62. The sequence returns to the step S38 or S2 respectively if said discrimination turns out negative or affirmative.

In the above-explained sequence, when the shutter release button is depressed by a half stroke (half-stroke depression switch 75 being closed) after the film is wound on the winding spool in the step S5, the power signal is released to turn on the transistor 73 whereby various circuits are powered and rendered active. During the continuation of the half-stroke depression, there are repeated termination of time measurement, resetting of the measured time t and start of time measurement (steps S10, S11 and S13), whereby the power signal is continued to hold the power supply. When the half-stroke depression state is terminated, there is discriminated whether a predetermined time (for example, 8 seconds) has elapsed since the start of time measurement (step S14), and, when said predetermined time has elapsed, the output of the power signal is terminated to interrupt the power signal, thereby terminating the power supply to various circuits. The holding of power supply is thus terminated.

During the output of said power signal, or during the holding of power supply, the transistor 65 remains turned on, whereby the plunger 16 is energized to maintain the magnetic head 10 in contact with the magnetic recording area 2b of the film 2. When the shutter release button is further depressed to turn on the shutter release switch 76, a phototaking operation is conducted, and, in the course of film advancement after said phototaking operation, the information recording is conducted in the magnetic recording area 2b. When the holding of power supply is terminated by the termination of the power signal, the transistor 65 is turned off, whereby the magnetic head 10 is retracted from the magnetic recording area 2b. Thus, in comparison with the case of constant contact of the magnetic head 10 with the magnetic recording area 2b, it is rendered possible to suppress the deterioration of the magnetic head 10 and to minimize the deformation of the film 2. Also in case the phototaking operation is repeated within said predetermined time (for example, 8 seconds), particularly in case of continuous phototaking operations, the magnetic head 10 is maintained in continuous contact with the magnetic recording area 2b instead of repeated contacts with and retractions from the film 2, whereby the deformation of the film 2 is further reduced.

In the above-explained embodiment, the microcomputer 50 constitutes the power supply holding means 102, the plunger 16 constitutes the head contact/retracting means 103, and the microcomputer 50 and the transistor 65 constitute the controller 104.

In the foregoing description there is employed a cartridge in which the film is advanced by rotation of the spool shaft of said cartridge, but the present invention is also applicable to an ordinary cartridge in which the lead end of the film is manually wound onto the winding spool as long as magnetic recording are provided on said film. Also the time of holding the power supply after the termination of the half-stroke depression state is not limited to 8 seconds. Furthermore, the information to be recorded in the magnetic recording area is not limited to the date and time of phototaking. Furthermore the contact/retracting device for the magnetic head 10 is not limited to the plunger 16.

As explained in the foregoing, the present invention maintains the magnetic head in contact with the magnetic recording area of the film during the holding time of power supply, namely during the half-stroke depressed state of the shutter release button and during a predetermined time after the cancellation of said half-stroke depressed state, and retracts the magnetic head from the magnetic recording area after the cancellation of the holding of power supply. This reduces the deterioration of the magnetic head and the deformation of the film in comparison with the conventional case of constant contact of the magnetic head with the magnetic recording area. Also in continuous phototaking operations, the magnetic head does not repeat the contacting and retracting motions, whereby the deformation of film is further suppressed.

What is claimed is:

1. A camera comprising:

recording means having a member movable between a first position for magnetically recording predetermined information in a magnetic recording area on a film and a second position for disabling the recording;

a half-stroke depression switch which is switched on by partial depression of a release button to a first stage and which is switched off by releasing the depression of the release button;

a release switch which is switched on by depression of the release button to a second stage beyond the first stage to perform an exposure operation;

time measuring means for measuring time in response to the switched-on state of said half-stroke depression switch;

moving means for moving said member of said recording means to said first position in response to a supply of electric power and for moving said member to said second position when the supply of the electric power is inhibited; and control means responsive to the switched-on state of said half-stroke depression switch to cause electric power to be supplied to said moving means, said control means holding the supply of electric power supply on until said time measuring means has completed measuring a predetermined time, regardless of whether said half-stroke depression switch has been switched off, and terminating the supply of electric power after completion of measuring the predetermined time by said time measuring means.

2. A camera according to claim 1, further comprising:

film advancing means for advancing the film from a cartridge; and wherein said control means inhibits the supply of electric power to said moving means during the advancing of the film with said film advancing means.

3. A camera according to claim 1, further comprising:

spool attachment means for attaching the film onto a spool; and wherein said control means inhibits the supply of electric power to said moving means during the attaching of the film onto the spool with said spool attachment means.

4. A camera according to claim 1, further comprising:

film rewinding means for rewinding the film into a cartridge; and wherein said control means inhibits the supply of electric power to said moving means during the rewinding the film into the cartridge with said film rewinding means.

5. A camera according to claim 1, further comprising:

film rewinding means for rewinding the film into a cartridge; and wherein said control means inhibits the supply of electric power to said moving means after said film rewinding means rewinds the film into the cartridge, until a next loading of a cartridge into the camera.

6. A camera according to claim 1, further comprising:

a manually operable main switch which enables phototaking when on and disables phototaking when off; and wherein said control means includes means for detecting the switched-on state of said half-stroke depression switch and means inhibiting the detecting when said main switch is off.

7. A camera according to claim 1, further comprising:

a manually operable main switch which enables phototaking when on and disables phototaking when off; and wherein said control means inhibits the supply of electric power to said moving means when said main switch is off.

8. A camera according to claim 1, further comprising:

trailing-end-of-film detecting means for detecting that the film has been wound to a trailing end thereof; and wherein said control means inhibits the supply of electric power to said moving means when said trailing-end-of-film detecting means detects that said film has been wound to the trailing end thereof.

9. A camera according to claim 1, further comprising:

frame advance means for winding the film by one frame after an exposure operation, in preparation for a subsequent exposure operation; and wherein said control means holds the supply of electric power to said moving means on while said frame advance means winds the film.

10. A camera according to claim 1, further comprising:

frame advance means for winding the film by one frame after an exposure operation, in preparation for a subsequent exposure operation; and wherein said time measuring means restarts measuring after said frame advance means winds the film by one frame, and said control means holds the supply of electric power to said moving means on until said time measuring means has completed measuring said predetermined time after the restart.

11. A camera according to claim 1, wherein:

said control means holds the supply of electric power to said moving means on during an exposure.

12. A camera according to claim 1, wherein:

said recording means includes a magnetic head which is in contact with said magnetic recording area of the film at said first position and which is retracted from said magnetic recording area of the film at said second position.

13. A camera according to claim 12, wherein:

said moving means moves said magnetic head between said first position and said second position.

14. A camera comprising:

recording means having a member movable between a first position for magnetically recording predetermined information in a magnetic recording area on a film and a second position for disabling the recording;

a half-stroke depression switch which is switched on by partial depression of a release button to a first stage and which is switched off by releasing the depression of the release button;

a release switch which is switched on by depression of the release button to a second stage beyond the first stage to perform an exposure operation;

power supply means for supplying electric power in response to the switched-on state of said half-stroke depression switch;

moving means for moving said member of said recording means between said first position and said second position; and control means responsive to said supplying of electric power by said power supply means to cause said moving means to move said member of said recording means to said first position.

15. A camera according to claim 14, wherein:

said recording means includes a magnetic head which is in contact with said magnetic recording area of the film at said first position and which is retracted from said magnetic recording area of the film at said second position.

16. A camera comprising:

recording means having a member movable between a first position for magnetically recording predetermined information in a magnetic recording area on a film and a second position for disabling the recording;

a half-stroke depression switch which is switched on by partial depression of a release button to a first stage and which is switched off by releasing the depression of the release button;

a release switch which is switched on by depression of the release button to a second stage beyond the first stage to perform an exposure operation;

a manually operable main switch which enables an exposure operation when on and disables an exposure operation when off;

moving means for moving said member of said recording means between said first position and said second position; and control means for causing said moving means to move said member of said recording means to said first position when said half-stroke depression switch is switched on and to move said member to said second position when said main switch is switched off.

17. A camera according to claim 16 wherein:

said recording means includes a magnetic head which is in contact with said magnetic recording area of the film at said first position and which is retracted from said magnetic recording area of the film at said second position.

18. A camera having a recording head for recording data on a photographing film, with the head being moveable from a retracted position to a recording position in response to an operation of a shutter release button, and further comprising time measuring means for measuring time in response to the operation of said shutter release button, and holding means responsive to said time measuring means for holding said head at said recording position until said time measuring means has measured a predetermined time.

19. A camera comprising:

recording means having a member movable between a first position for magnetically recording predetermined information in a magnetic recording area on a film and a second position for disabling the recording;

a half-stroke depression switch which is switched on by partial depression of a release button to a first stage and which is switched off by releasing the depression of the release button;

a release switch which is switched on by depression of the release button to a second stage beyond the first stage to perform an exposure operation;

time measuring means which is enabled to complete measuring of a predetermined time in response to switching off of said half-stroke depression switch;

moving means for moving said member of said recording means to said first position in response to a supply of electric power and for moving said member to said second position when the supply of the electric power is inhibited; and control means responsive to the switched-on state of said half-stroke depression switch to cause electric power to be supplied to said moving means, said control means holding the supply of electric power on until said time measuring means has completed measuring the predetermined time, and terminating the supply of electric power after completion of measuring the predetermined time by said time measuring means.

20. A camera according to claim 19, further comprising:

film advancing means for advancing the film from a cartridge; and wherein said control means inhibits the supply of electric power to said moving means during the advancing of the film with said film advancing means.

21. A camera according to claim 19, further comprising:

spool attachment means for attaching the film onto a spool; and wherein said control means inhibits the supply of electric power to said moving means during the attaching of the film onto the spool with said spool attachment means.

22. A camera according to claim 19, further comprising:

film rewinding means for rewinding the film into a cartridge; and wherein said control means inhibits the supply of electric power to said moving means during the rewinding the film into the cartridge with said film rewinding means.

23. A camera according to claim 19, further comprising:

film rewinding means for rewinding the film into a cartridge; and wherein said control means inhibits the supply of electric power to said moving means after said film rewinding means rewinds the film into the cartridge, until a next loading of a cartridge into the camera.

24. A camera according to claim 19, further comprising:

a manually operable main switch which enables phototaking when on and disables phototaking when off; and wherein said control means includes means for detecting the switched-on state of said half-stroke depression switch and means inhibiting the detecting when said main switch is off.

25. A camera according to claim 19, further comprising:

a manually operable main switch which enables phototaking when on and disables phototaking when off; and wherein said control means inhibits the supply of electric power to said moving means when said main switch is off.

26. A camera according to claim 19, further comprising:

trailing-end-of-film detecting means for detecting that the film has been wound to a trailing end thereof; and wherein said control means inhibits the supply of electric power to said moving means when said trailing-end-of-film detecting means detects that said film has been wound to the trailing end thereof.

27. A camera according to claim 19, further comprising:

frame advance means for winding the film by one frame after an exposure operation, in preparation for a subsequent exposure operation; and wherein said control means holds the supply of electric power to said moving means on while said frame advance means winds the film.

28. A camera according to claim 19, further comprising:

frame advance means for winding the film by one frame after an exposure operation, in preparation for a subsequent exposure operation; and wherein said time measuring means restarts measuring time after said frame advance means winds the film by one frame, and said control means holds the supply of electric power to said moving means on until said time measuring means has completed measuring said predetermined time after the restart.

29. A camera according to claim 19, wherein:

said control means holds the supply of electric power to said moving means on during an exposure.

30. A camera according to claim 19, wherein:

said recording means includes a magnetic head which is in contact with said magnetic recording area of the film at said first position and which is retracted from said magnetic recording area of the film at said second position.

31. A camera according to claim 30, wherein:

said moving means moves said magnetic head between said first position and said second position.

32. A camera comprising:

a recorder having a member movable between a first position for magnetically recording predetermined information in a magnetic recording area on a film and a second position for disabling the recording;

a half-stroke depression switch which is switched on by partial depression of a release button to a first stage and which is switched off by releasing the depression of the release button;

a release switch which is switched on by depression of the release button to a second stage beyond the first stage to perform an exposure operation;

a timer which is enabled to complete measuring of a predetermined time in response to switching off of said half-stroke depression switch;

a moving member to move said member of said recorder to said first position in response to a supply of electric power and to move said member of said recorder to said second position when the supply of the electric power is inhibited; and a controller responsive to the switched-on state of said half-stroke depression switch to cause electric power to be supplied to said moving member, said controller holding the supply of electric power on until said timer has completed measuring the predetermined time, and terminating the supply of electric power after completion of measuring the predetermined time by said timer.

33. A camera comprising:

a recorder having a member movable between a first position for magnetically recording predetermined information in a magnetic recording area on a film and a second position for disabling the recording;

a half-stroke depression switch which is switched on by partial depression of a release button to a first stage and which is switched off by releasing the depression of the release button;

a release switch which is switched on by depression of the release button to a second stage beyond the first stage to perform an exposure operation;

a power supply portion to supply electric power in response to the switched-on state of said half-stroke depression switch;

a moving member to move said member of said recorder between said first position and said second position; and a controller responsive to said supplying of electric power by said power supply portion to cause said moving member to move said member of said recorder to said first position.

34. A camera comprising:

a recorder having a member movable between a first position for magnetically recording predetermined information in a magnetic recording area on a film and a second position for disabling the recording;

a half-stroke depression switch which is switched on by partial depression of a release button to a first stage and which is switched off by releasing the depression of the release button;

a release switch which is switched on by depression of the release button to a second stage beyond the first stage to perform an exposure operation;

a manually operable main switch which enables an exposure operation when on and disables an exposure operation when off;

a moving member to move said member of said recorder between said first position and said second position; and a controller to cause said moving member to move said member of said recorder to said first position when said half-stroke depression switch is switched on and to move said member to said second position when said main switch is switched off.

\* \* \* \* \*